Nov. 5, 1946.    N. LESTER    2,410,510
MOLDING THERMOSETTING MATERIAL
Filed July 4, 1942

INVENTOR.
NATHAN LESTER
BY Oberlin, Limbach & Day.
ATTORNEYS

Patented Nov. 5, 1946

2,410,510

UNITED STATES PATENT OFFICE 2,410,510

MOLDING THERMOSETTING MATERIAL

Nathan Lester, Cleveland Heights, Ohio, assignor to Lester Engineering Company, Cleveland, Ohio, a corporation of Ohio Application July 4, 1942, Serial No. 449,758

14 Claims. (Cl. 18—30)

The present invention relates to the pressure molding of thermosetting plastic material, i. e., the formation of such material into desired shape in a molding die cavity by the application of proper pressures and temperatures thereon. Thermosetting or "hot-set" plastic materials undergo, during the pressure molding operation, phase changes involving three different phases or physical forms, namely: The initial solid form, such as that of a powdered or granulated material, the second plasticized form wherein the material enters the plastic or sufficiently fluid state to be caused to flow into and completely fill the mold cavity, and thirdly, the permanently solidified or infusible state wherein the material undergoes a chemical change or polymerization, which latter phase change is usually referred to in the practice as "the cure." The thermosetting or hot set molded plastic materials are exemplified by the phenolic and urea resinoid condensation products.

Heretofore the thermosetting plastic materials have been molded by means of the compression molding and the transfer molding processes. In the first, the material is loaded directly into the mold cavity wherein an initial pressure and heat is applied until plasticization occurs, and then additional pressure exerted during the curing stage. In the transfer molding method the material is plasticized by heat at a point removed, or outside of the mold body itself, and then as a plastic, it is transferred through an orifice into the mold cavity where it becomes cured or solidified. Compression molding has been subject to the disadvantage of requiring a relatively long period of time for the performance of the molding cycle, two to ten minutes being necessary for the polymerizing or curing stage alone. The transfer molding method is more rapid, but is subject to the disadvantage of producing an over-heating or over-curing of the material retained in the plasticizing chamber. Quite frequently, a hardened and infusible slug will form in the plasticizing chamber of the transfer molding apparatus, thus interrupting the operation of the process and apparatus until such slug can be removed.

It is therefore the general object and nature of my invention to provide a process and apparatus for molding thermosetting material wherein the complete molding operation or cycle can be performed at a relatively rapid rate and wherein the pressure chamber is discharged or evacuated of the entire charge of material at each stroke, so that there is no opportunity for the solidification or curing of a slug of excess material therein.

Briefly outlined, my process involves the transmittal of a given quantity or charge of the plastic material in its initially, finely divided solid form from a pressure chamber into the mold proper in one continuous operation, and wherein the material is plasticized during its travel from the pressure chamber to the mold cavity, and all of the so plasticized material is incorporated into the mold body and removed from the pressure molding machine at each and every stroke. The temperature conditions imposed upon the material to be molded, during its transmittal from the initial and solid to the plasticized and finally to the infusible state, are such that if there is any excess material present over and above that necessary to completely fill the mold proper, such excess will be maintained in its original granular or powdered form when in the pressure cylinder and will not operate to cause a clogging of the latter.

Additional objects and advantages of the invention shall become apparent as the following description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

The pressure molding process embodying the principle of my invention involves the following detailed steps, wherein those having to do with the phase change of the thermosetting plastic material are conducted, in effect, as one continuous operation:

1. Charging of given quantity of solid, finely divided thermosetting material into the pressure chamber.
2. Evacuating material under pressure from pressure chamber.
3. Maintaining temperature of material, while in pressure chamber, at below the plasticization point.
4. Subjecting material in elongated gates or runners to a temperature sufficient to produce plasticization thereof (in the case of phenolic thermosetting plastic material, about 350° F.).
5. Subjecting plasticized material in mold cavities to further curing heat and pressure to cure or hot set the material.
6. Opening die blocks and evacuating entire body of material in the form of castings proper, runners and gate slug.

Steps 2 to 5 as delineated above are conducted in what is in practical effect one continuous operation, wherein the material is transformed from its initially solid to its finally cured or solidified state in a relatively short period of time, i. e., less than one minute. This is to be compared to the 2 to 10 minutes of curing time alone required in the compression molding method as heretofore practiced. Furthermore, since none of the material is subjected to a plasticizing temperature in the pressure chamber, there is no opportunity for the formation of a set slug in the latter, as compared to the transfer molding method.

The apparatus as illustrated in the accompanying drawing is particularly designed for the performance of the above process, and a detailed description of such apparatus will serve to further illustrate the practice of such process.

Figure 4:
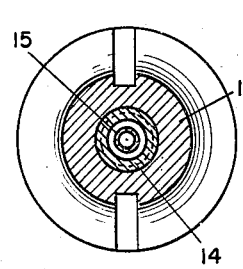
Fig. 4 is an enlarged cross sectional view taken substantially along line 4—4 of Fig. 2.
Figure 1:
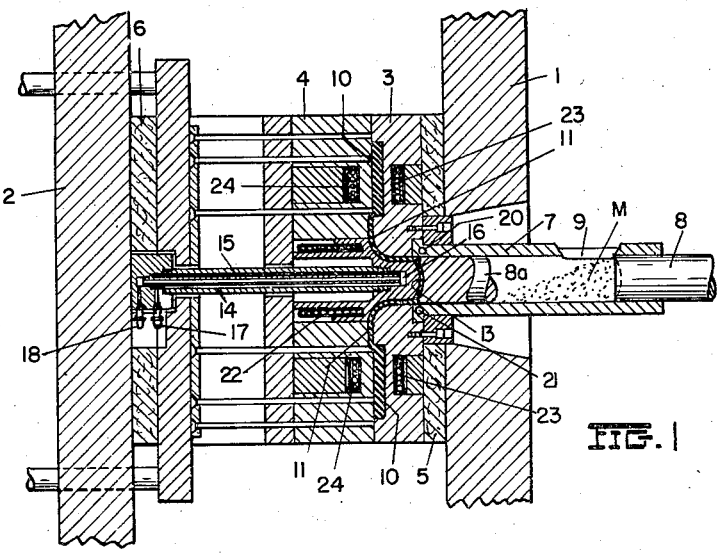
Fig. 1 is a sectional view taken through the pressure plunger cylinder and die blocks of a machine embodying the principle of my invention and adapted to perform the novel process thereof.
Figure 2:
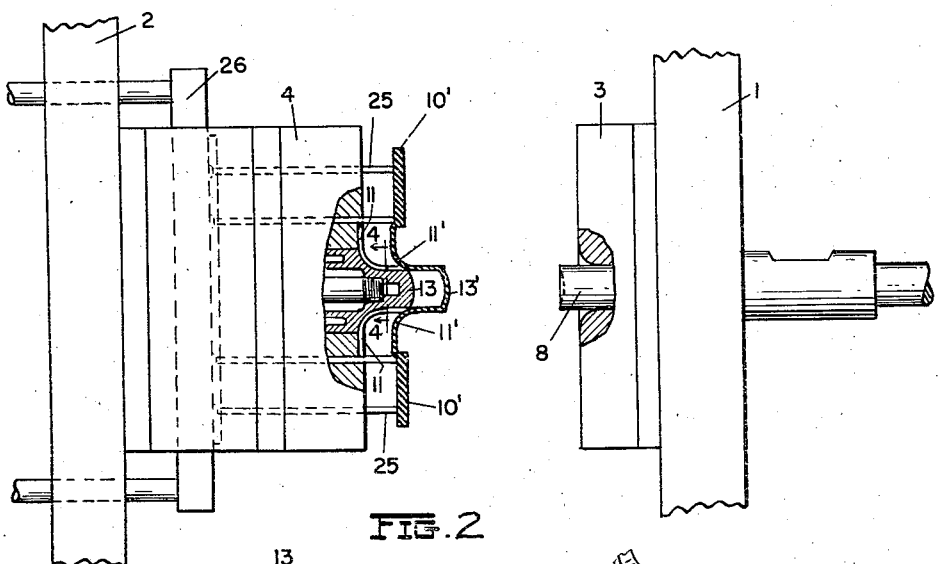
Fig. 2 is an elevational view of Fig. 1 but showing the die blocks in open position.
Figure 3:
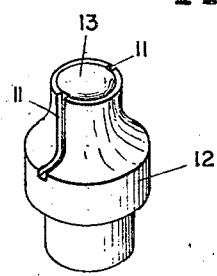
Fig. 3 is an enlarged, perspective view of that part of the die blocks forming the plasticizing runners or gates of the mold cavity and also the removable discharge end wall of the pressure plunger cylinder.

In Figs. 1 and 2 there are shown a pair of separable platens 1 and 2, such as heretofore found in an injection molding machine for the pressure molding of thermoplastic plastic materials. The platen 1 is fixed or stationary and the platen 2 is movable with respect thereto. Die blocks 3 and 4 are carried by the platens 1 and 2, respectively, and insulated therefrom by the respective layers 5 and 6 of insulating material. A pressure cylinder 7, in which the pressure plunger 8 is adapted to reciprocate, is mounted in the platen 1 and has its left hand or discharge end terminating in the die block 3. A feed opening 9 is provided for the introduction of the powdered or granular thermosetting plastic material such as that illustrated at M in Fig. 1.

The die blocks 3 and 4 form a mold cavity comprising the portions 10 which form the casting proper, and the relatively narrow or elongated runners or gate channels 11 leading from the cavity portions 10 to the discharge end of the pressure cylinder 7.

The movable die block 4 has a central insert 12 which projects outwardly therefrom and is adapted to form the removable left hand end wall 13 of the pressure cylinder 7 when the die blocks are in closed position as shown in Fig. 1. The outer diameter of the end wall 13 is substantially equal to the inner diameter of the pressure cylinder 7, so that it can make a slight re-entrant or telescopic fit into the end thereof. The projecting insert 12 also has the channels 11 which form a portion of the runners leading to the mold cavity portions 10.

A cooling medium, such as water, is introduced to the interior of the insert 12 at a point immediately behind the end wall 13. This is accomplished by means of the concentric water tubes 14 and 15 which terminate at the inner bore or space 16 inside the insert 12 and are connected at their outer ends by means of the fittings 17 and 18, respectively, to flexible water line conduits (not shown). Cooling water ducts, seen at 20 and 21 in Fig. 1 are also provided in the wall of the pressure cylinder 7 immediately adjacent its left hand or discharge end. The cooling water, or other coolant medium is circulated through the concentric tubes 14 and 15 and the ducts 20 and 21 at a temperature and rate sufficient to maintain the outer surface of the wall 13 and the interior of the pressure cylinder 7 at a point below that at which plasticization of the material M, under the pressure applied, might occur.

An electrical resistant heating coil 22 is mounted in the insert 12 exteriorly of the cooling tubes 14 and 15. The heat produced and generated from the heating coil 22 is transmitted through the body of the insert 12, and also through the body of the die block 4, so as to heat the runners 11. Such heat in the runners 11 is maintained at a temperature (viz. about 350° F. in the case of phenolic thermosetting material) sufficient to produce a plasticization of the material as it passes therethrough under pressure, and into the mold cavity portions 10. Additional electrical heating elements 23 and 24 are provided in the die blocks 3 and 4, respectively, at points adjacent the mold cavity portions 10 which form the castings proper. It is at this latter point that the plasticized material is subjected to the final cure or additional heat and pressure treatment sufficient to polymerize and "hot set" the plastic material to its final solidified or infusible state.

Ejector pins 25, connected to the ejector plate 26, move outwardly and operate to eject the entire casting, including the casting portions proper 10', runners 11' and gate slug 13', as the die blocks 3 and 4 are moved into open position. Simultaneously, the pressure plunger 8 is moved to a position slightly outwardly of the face or parting line of the die block 3 to completely evacuate the pressure cylinder 7 and clean all of the material out of it.

Figure 5:
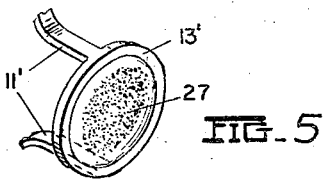
Fig. 5 is an enlarged, perspective view of the end of the gate or runner slug of the casting, illustrating the occurrence at that point of both the cured and the unplasticized molding material.

As illustrated in Fig. 5, the material found in the gate slug 13' is partially solidified and partially in its original unplasticized state, such as that indicated at 27 in the central portion of the slug 13'.

Thus, it will be seen, that as the pressure plunger 8 moves from its position 8 to 8a in Fig. 1, that the initially finely divided, solid material M is forced through the elongated runners 11 where it is simultaneously plasticized under the application of heat and pressure and thence to the mold cavity portions 10 where it is subjected to a further curing heat and pressure; and that as the finished casting is ejected from the dies, and the plunger 8 moved out through the end of the pressure cylinder 7, all of the original charge of material M is likewise removed from the machine and the latter is ready to perform a repeat cycle of operations. Thus, there is no opportunity for any excess of material becoming cured or set in the pressure chamber, or of contamination of one casting with material left over from a previous "shot" or operation.

My above described method and apparatus renders it possible to obtain a high rate of operation and increased quantity of production in the pressure molding of thermosetting material, while at the same time eliminating certain definite difficulties and disadvantages heretofore encountered in the pressure molding of such materials. My invention has rendered possible the practical and operative adaptation of injecting molding principles to the thermosetting plastic material field.

Other modes of applying the principle of the invention may be employed, change being made as regards the details described, provided the features stated in any of the following claims or the equivalent of such be employed.

I therefore particularly point out and distinctly claim as my invention:

1. The method of molding thermosetting plastic material, comprising the steps of providing a quantity of finely divided solid material to be molded, applying pressure to such material in a pressure chamber and while in the solid state educting the material from the pressure chamber toward a molding cavity, and applying heat to such material sufficient to cause a plasticization thereof at a point between the pressure chamber and the molding cavity.

2. The injection molding method for thermosetting plastic material, consisting in the steps of charging a quantity of finely divided solid material into a pressure ejection chamber, discharging said material from said injection chamber and maintaining said material while within the confines of said chamber, in such finely divided solid state, passing said material through a connecting passage to a mold cavity, and heating said material, while passing through said passage, to a temperature sufficient to cause a plasticization thereof.

3. The method of molding thermosetting plastic material, comprising the steps of providing a quantity of finely divided solid material to be molded, applying pressure to such material in a pressure chamber and while in the solid state, educting the material from the pressure chamber toward a molding cavity, applying heat to such material sufficient to cause a plasticization thereof at a point between the pressure chamber and the molding cavity, and subjecting such plasticized material when in said cavity, to further heat and pressure sufficient to produce solidification thereof.

4. The injection molding method for thermosetting plastic material, consisting in the steps of charging a quantity of finely divided solid material into a pressure injection chamber, discharging said material from said injection chamber and maintaining said material while within the confines of said chamber, in such finely divided solid state, passing said material through a connecting passage to a mold cavity, heating said material, while passing through said passage, to a temperature sufficient to cause a plasticization thereof, and subjecting such plasticized material when in said cavity, to further heat and pressure sufficient to produce solidification thereof.

5. The method of molding thermosetting plastic material, consisting in the steps of providing a quantity of finely divided solid material to be molded, forcing such material under pressure from a pressure chamber into a molding cavity, maintaining the temperature in said pressure chamber sufficiently low to retain such material therein in the solid state, and applying heat to such material sufficient to cause a plasticization thereof at a point between the pressure chamber and the molding cavity.

6. The injection molding method for thermosetting plastic material, consisting in the steps of transmitting a quantity of finely divided solid material from a pressure injection chamber through a connecting passage to a mold cavity, maintaining such material, while in said pressure chamber, at a temperature low enough to retain it in said state, and subjecting said material, while passing through said passage, to a temperature sufficient to cause a plasticization thereof.

7. The method of molding thermosetting plastic material, consisting in the steps of providing a quantity of finely divided solid material to be molded, forcing such material under pressure from a pressure chamber into a molding cavity, maintaining the temperature in said pressure chamber sufficiently low to retain such material therein in the solid state, applying heat to such material sufficient to cause a plasticization thereof at a point between the pressure chamber and the molding cavity, and subjecting such plasticized material when in said cavity, to further heat and pressure sufficient to produce solidification thereof.

8. The injection molding method for thermosetting plastic material, consisting in the steps of transmitting a quantity of finely divided solid material from a pressure injection chamber through a connecting passage to a mold cavity, maintaining such material, while in said pressure chamber, at a temperature low enough to retain it in said state, subjecting said material, while passing through said passage, to a temperature sufficient to cause a plasticization thereof, and subjecting such plasticized material when in said cavity, to further heat and pressure sufficient to produce solidification thereof.

9. The method of molding thermosetting plastic material, comprising the steps of providing a quantity of finely divided solid material to be molded, forcing said material under pressure and while in the solid state from a pressure chamber to an elongated passage and thence into a mold cavity, cooling the entrance end of said passage and heating its remaining portion to a temperature sufficient to cause plasticization of material traveling therethrough, and subjecting said material while in said mold cavity and while in the heated portion of said passage, to further heat and pressure sufficient to cause solidification of such material therein.

10. The injection method of molding plastic material which transforms from initially solid to plastic and finally to infusible state during the molding operation, consisting in the steps of injecting a finely divided body of such material in the initial solid state from a pressure injection chamber into a forming mold, maintaining the temperature of said material throughout its travel through said chamber at a point sufficiently low to remain in such solid state subjecting all but a small fraction of such body of material, after passing through said chamber, to a temperature sufficient to transform the material into the plastic state, further subjecting such material when in said mold to sufficient heat and pressure to transform it into the infusible state, and evacuating the entire body of the originally provided material from the injection chamber on each stroke of operation.

11. In a pressure molding machine having a pressure chamber, separable die blocks forming a plurality of mold cavities with a plurality of runners for said cavities located in their parting line, the improvement which comprises a projection mounted on one of said die blocks and entrant into the discharge end of said pressure chamber, and divergent runners in the outer surface of said projection forming a continuation of said first-named runners, heating means located adjacent said mold cavities and said runners for heating the surfaces thereof, and cooling means adjacent said discharge end of said pressure chamber for cooling the interior of the latter.

12. In a pressure molding machine having a pressure chamber, separable die blocks forming a plurality of mold cavities with a plurality of runners for said cavities located in their parting line, the improvement which comprises a projection mounted on one of said die blocks and entrant into the discharge end of said pressure chamber, and curved runners in the outer surface of said projection forming a continuation of said first-named runners, heating means located adjacent said mold cavities and said runners for heating the surfaces thereof, and cooling means adjacent said discharge end of said pressure chamber for cooling the interior of the latter.

13. In a pressure molding machine having a material injection cylinder and a pressure plunger reciprocable therein, separable die blocks forming a plurality of mold cavities with a plurality of runners for said cavities located in their parting line, the improvement which comprises an insert fixed in one of said die blocks and projecting into the discharge end of said cylinder, said insert having an outer diameter substantially equal to the inner diameter of said cylinder, and curved runners in the outer surface of said insert leading from the parting line of said die blocks and each forming a continuation of said first-named runners, heating means located adjacent said mold cavities and said runners for heating the inner surfaces thereof, cooling means located in said insert for cooling the surface of the latter, and a second cooling means located in the wall of said cylinder for cooling the interior thereof.

14. Apparatus for molding heat plasticizable material, comprising in combination cooperating dies providing molding cavities, one of said dies having a bore extending from the outer face thereof to the parting line between the dies, a cylinder having an open end extending into said bore, a plunger movable within said cylinder to force said material as a cylindrical mass in the direction of said dies, a nose secured in the die beyond the parting line in alignment with said bore and extending into the cylinder, and means for supplying heat to said nose to raise the same to a temperature above the temperature of the material within said cylinder.

NATHAN LESTER.